June 16, 1959  J. R. HOLLINS  2,891,118

AUTOMOTIVE LIGHTING AND TURN SIGNALING SYSTEMS

Filed Feb. 17, 1956

INVENTOR.
Jesse R Hollins

ATTORNEY

United States Patent Office 2,891,118
Patented June 16, 1959

2,891,118

AUTOMOTIVE LIGHTING AND TURN SIGNALING SYSTEMS

Jesse R. Hollins, Brooklyn, N.Y., assignor, by mesne assignments, to Abraham Hollins and Jesse R. Hollins, Brooklyn, Lewis S. Hollins, Great Neck, and Theodore D. Davidson, New York, N.Y.

Application February 17, 1956, Serial No. 566,160

2 Claims. (Cl. 200—61.54)

This invention relates to automotive lighting and turn signaling systems and, more particularly, to a novel switch unit mechanically operable by a conventional turn signal switch selector lever to cut out the tail lamps on the side of the vehicle having flashing turn signal lamps.

The conventional vehicle lighting system includes a three position headlamp control switch having an input tap connected to the battery (usually through the ammeter), a tap connected to the parking lamps, a tap connected to the headlamps, and a tap connected to the tail lamps. In one "on" position, the headlamp switch connected the parking and tail lamps to the battery and, in the other "on" position, connects the head and tail lamps to the battery. In the "off" position, of course, all these lamps are disconnected from the battery.

Most modern vehicles are also equipped with a turn signaling system. Conventionally, such a system includes a turn signal switch mounted on the steering column and having a selector arm movable in either direction from "neutral" to signal a right or left turn. In either operated position, signal lamps on the corresponding side of the vehicle, at the front and rear, are connected to battery through a flasher for intermittent energization. The flasher, of which there are many conventional types, usually thermostatically operated, may also operate or flash a pilot or indicator lamp. Signal switches are commonly either manually operated or self concelling. In the case of manually operated signal switches the operator has to shut off the signal switch manually. In the case of the self cancelling switch, straightening of the vehicle wheels, after completion of the turn, cancels the signal indication by means of a cam ring on the steering wheel shaft operating a release for the selector lever.

The signal lamps may be separate units or may be the parking and brake lamps. In any event, they are located immediately adjacent the tail lamps. The steadily burning tail lamp immediately adjacent the flashing turn signal lamp detracts from the signaling effect of the latter, and I have disclosed in prior applications signal systems in which the tail lamps are under the joint control of the headlamp switch and the turn signal switch so that the tail lamp on one side of the vehicle is extinguished when the signal lamp on the same side is flashed to indicate a turn. This extinguishment of the tail lamp greatly enhances the signaling effect of the signal lamp as the effective light of the latter varies from zero to a high value.

However, the conventional turn signal arrangement on present cars does not include this tail lamp extinguishing feature. It is, accordingly, the principal object of this invention to provide a novel signal unit, including a pair of normally closed switches interposed between the headlamp control switch and the tail lamps and mechanically operable by the signal switch selector lever to cut out the tail lamp on one side of the vehicle whenever the signal lamp on such side of the vehicle is flashed.

A further object is to provide a vehicle lighting and turn signaling system incorporating such a switch unit.

For an understanding of the invention principle, reference is made to the following description of a typical embodiment thereof as illustrated in the accompanying drawing. In the drawing.

Figure 1:
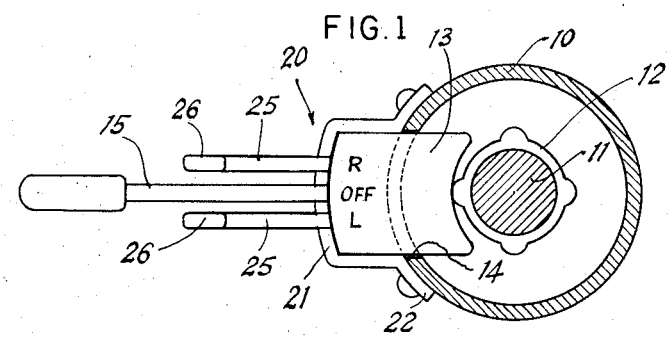
Fig. 1 is a sectional view of the vehicle steering column illustrating the invention switch unit mounted in operative relation with the selector lever of a typical turn signaling switch.
Figure 2:
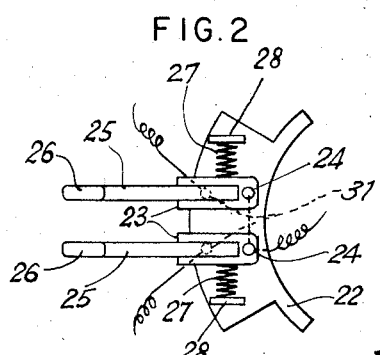
Fig. 2 is a plan view of the invention switch unit.
Figure 3:
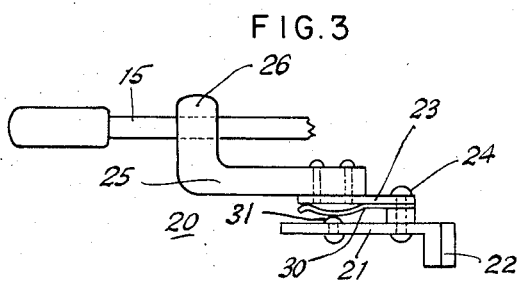
Fig. 3 is a side elevation view thereof.

Referring to Figs. 1, 2 and 3, the usual tubular steering column 10 of a vehicle is illustrated as enclosing steering shaft 11 to which is secured cam ring 12 cooperable with a standard or conventional self canceling turn signaling switch 13 mounted in a slot 14 in column 10 and having an operating lever 15. As is known not only to those skilled in the art but also to most automotive vehicle operators, when lever 15 is moved upwardly to the right turn position, turn signal lamps on the right side of the vehicle, at the front and rear thereof are flashed. In the case of a self canceling signal switch, as the vehicle makes the turn and shaft 11 is rotated back to straighten the wheels, cam ring 12 restores switch 13 and lever 15 to the neutral position. A similar action occurs when lever 15 is pulled down to indicate a left turn. With a manually restored signal switch, the operator moves lever 15 back to neutral after the turn is completed.

In accordance with the invention, tail lamp cut out switch unit 20 is mounted on column 10 directly adjacent switch 13 for operation of its control elements by selector lever 15. Unit 20 comprises a base or mounting plate 21, preferably of dielectric material, having an arcuate inner end 22 for conforming attachment to column 10. A pair of operators 25 are pivotally mounted on plate 21 in spaced relation so as to extend along each side of selector lever 15.

Each operator 25 includes a dielectric member 23 pivotally secured to plate 21 by a contact or terminal pivot 24. The free end of each plate 23 has secured thereto the operator 25 which has a projecting end 26 extending into the plans of movement of selector lever 15. Suitable biasing means, such as coil springs 27 engaged between each operator 25 and stops 28 on plate 21, bias operators 25 toward lever 15.

A contact spring 30 is secured along the underside of each plate 23 in circuit connection with contact pivots 24. In the normal position of operators 25, springs 30 engage contacts or terminals 31 on plate 21. When selector lever 15 is moved to indicate a turn, one of the operators 25 is also moved, by engagement of its extension 26 with lever 15, disengaging its spring 30 from contact 31 and thus opening a circuit including contact pivot 24 and contact 31. As lever 15 is restored to neutral by cam ring 12, spring 27 biases the displaced operator 25 back to the illustrated circuit closing position.

Figure 4:
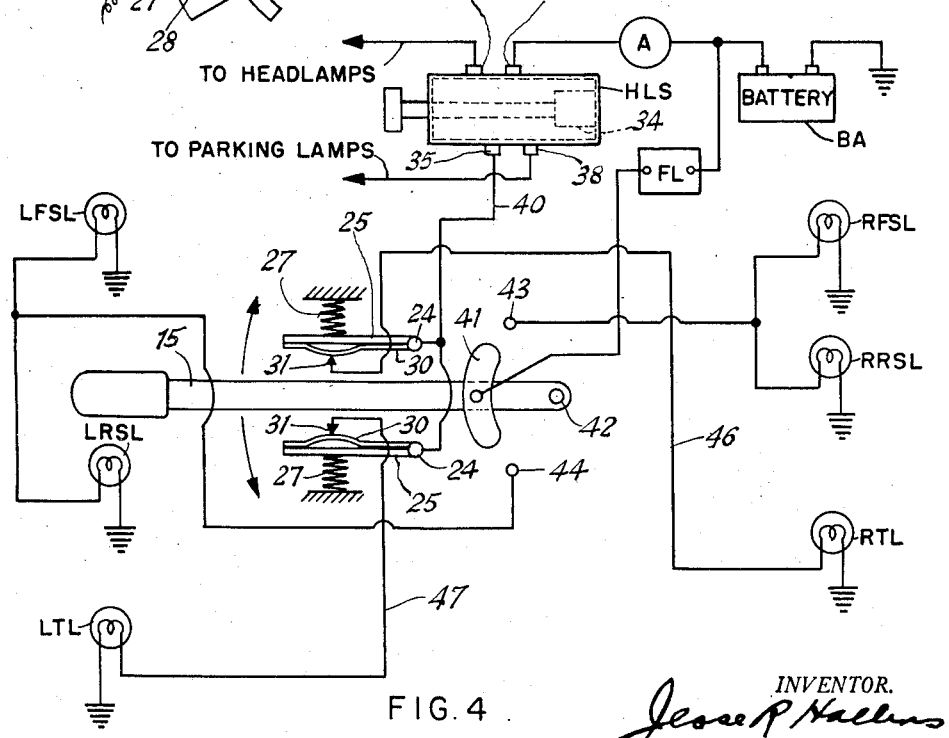
Fig. 4 is a schematic wiring diagram of a vehicle lighting and signaling system incorporating the switch unit.

Referring to Fig. 4, the vehicle lighting system is illustrated by way of simplified example only as including a conventional headlamp control switch HLS having a movable circuit closer 34, an input tap 36 connected to grounded battery BA through ammeter A, a headlamp tap 37, a parking lamp tap 38, and a tail lamp tap 35. Signal switch selector lever 15 is conventionally illustrated as carrying a contact member 41 connected through a conventional flasher FL to battery BA, lever 15 being pivoted at 42. Flasher FL may operate a pilot or indicator lamp (not illustrated) whenever a turn signal is flashed. Contact member 41 is selectively engageable with either of a pair of contacts 43, 44. Contact 43 is connected to grounded right front and right rear signal lamps RFSL and RRSL. Similarly, contact 44 is connected to grounded left front and left rear signal lamps LFSL and LRSL. If desired, and in the usual case, the lighting system may include stop lamps alternatively used as signal lamps; and such arrangement has been illustrated in order to simplify the drawing.

In signaling a turn, lever 15 is moved to engage contact member 41 with one of the contacts 43 or 44, thus connecting the corresponding signal lamps to battery BA through flasher FL to intermittently energize the signal lamps to indicate a proposed turn.

In accordance with the invention tail lamp tap 35 is connected to one pivot contact or terminal 24 of switch unit 20, by conductor 40, and a jumper or conductor 45 interconnects the two pivot contacts. Conductor 46 connects one contact 31 to right tail lamp RTL, and conductor 47 connects the other contact 31 to left tail lamp LTL.

In the neutral position of selector lever 15, both tail lamps TL are connected to switch HLS through conductors 40, 45, 46, 47 and contacts 31 engaged with spring contacts 30 connected to contact terminals 24. Whenever lever 15 is moved to signal a right turn, for example, upper operator 25 is moved by lever 15 to disengage its spring 30 from its contact 31, opening the circuit to right tail lamp RTL. Thus, lamps RFSL and RRSL are flashed, but lamp RTL is extinguished. This extinguishment accentuates the signaling effect of the adjacent signal lamp RRSL. A corresponding effect occurs when lever 15 is moved to signal a left turn.

While not specifically illustrated, the tail lamps cut out unit may include suitable adjustment means to accommodate different turn signal switch operating ratios.

While a specific embodiment of the invention has been shown and described in detail to illustrate the application of the invention principle, it will be understood that the invention may be embodied otherwise without departing from such principle.

I claim:

1. A tail lamp cutout switch unit comprising, in combination, a base constructed and arranged for mounting on the steering column of an automotive vehicle; a pair of normally closed switches in spaced relation on said base and each including first and second terminals on said base, a circuit closer normally interconnecting said terminals, and an operator movably mounted on said base and carrying the circuit closer; each operator having an outer end projecting longitudinally of the steering column; and a turn signal switch selector lever mounted for movement parallel to said base and extending outwardly between said outer ends in its neutral position and selectively engageable with one of the latter, upon movement of said lever to signal a turn, to move the selected operator to disconnect the associated circuit closer from at least one of the terminals of the associated switch.

2. A tail lamp cutout switch unit as claimed in claim 1 in which said base is dielectric and has an arcuate inner end engageable with the steering column; each operator is pivotted to a first terminal; each circuit closer is electrically connected to a first terminal and normally engages the associated second terminal; and means biasing said operators toward said selector lever.

References Cited in the file of this patent
UNITED STATES PATENTS

| | | |
|---|---|---|
| 1,584,761 | Fischer | May 18, 1926 |
| 1,885,526 | Lucius | Nov. 1, 1932 |
| 2,010,454 | Haltrich et al. | Aug. 6, 1935 |
| 2,238,394 | Murray | Apr. 15, 1941 |
| 2,267,743 | Murray | Dec. 30, 1941 |
| 2,607,864 | Hollins | Aug. 19, 1952 |
| 2,672,531 | Stevenson | Mar. 16, 1954 |
| 2,788,406 | Cavanaugh | Apr. 9, 1957 |

FOREIGN PATENTS

| | | |
|---|---|---|
| 303,462 | Great Britain | Jan. 4, 1929 |